Figure 1:
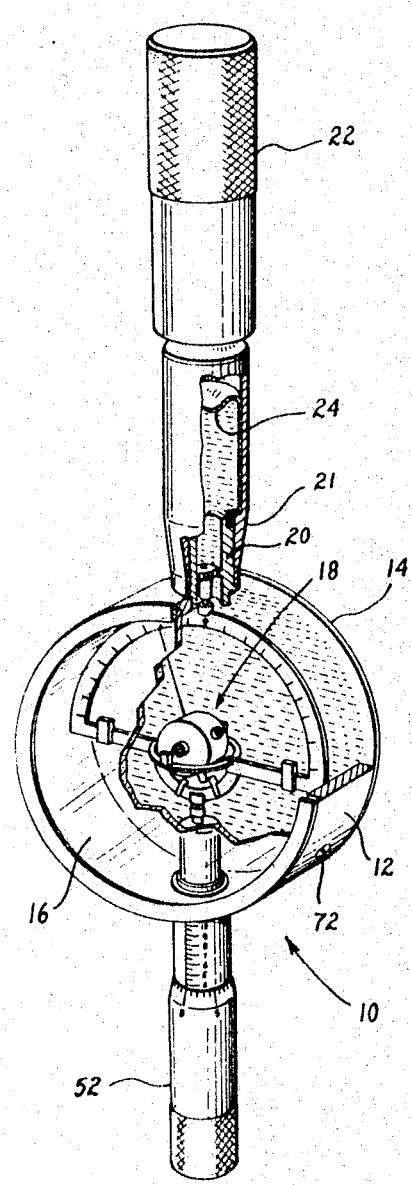

Aug. 26, 1969      E. J. SHARPE      3,462,830
METHOD OF MAKING A MAGNETOMETER
Filed Oct. 29, 1964      2 Sheets-Sheet 1

INVENTOR
EDGAR J. SHARPE
BY: Fetherstonhaugh & Co
ATTORNEYS

Aug. 26, 1969    E. J. SHARPE    3,462,830
METHOD OF MAKING A MAGNETOMETER
Filed Oct. 29, 1964    2 Sheets-Sheet 2
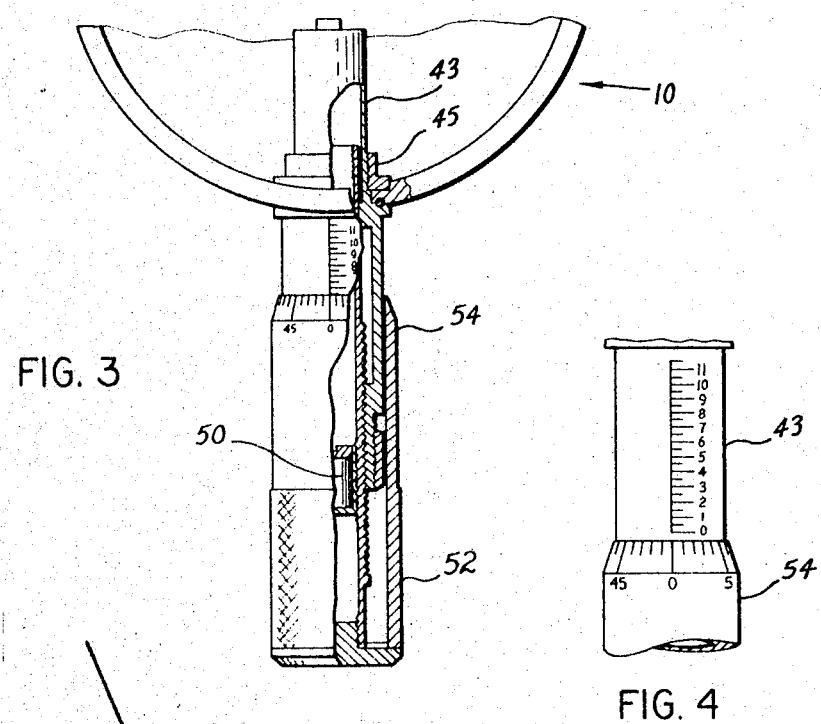
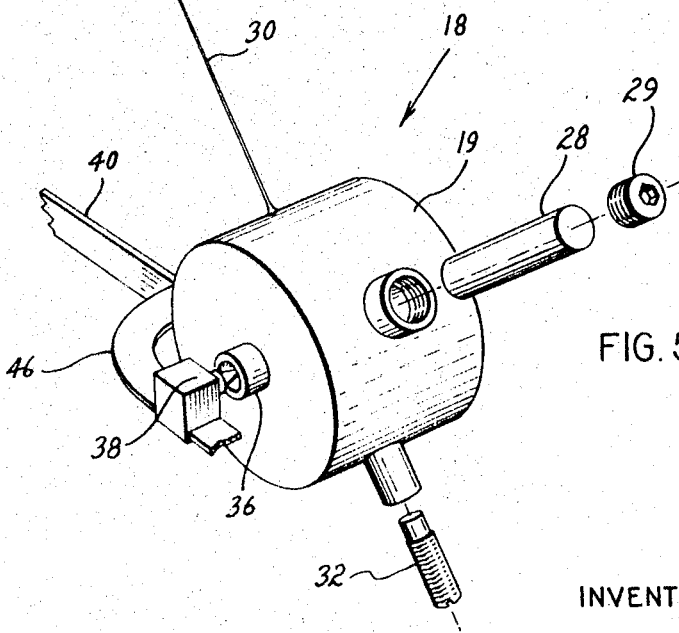
INVENTOR
EDGAR J. SHARPE
BY: *Fetherstonhaugh & Co*
ATTORNEYS Patented Aug. 26, 1969

3,462,830
METHOD OF MAKING A MAGNETOMETER
Edgar J. Sharpe, Willowdale, Ontario, Canada, assignor to Edgar Sharpe & Associates Limited, Toronto, Ontario, Canada
Filed Oct. 29, 1964, Ser. No. 407,317
Int. Cl. G01r 3/00, 33/00
U.S. Cl. 29—592　　　2 Claims This invention relates to a magnetic search instrument, that is an instrument that has a pivotally mounted magnet system that is adapted to align with a magnetic field to be explored.

It is an object of the invention to make a magnetic exploration instrument that is accurate for its size, shock resistant and economical to build. The invention will be described in relation to a magnetometer, although its application, in at least some respects, is broader than the magnetometer.

It is common practice to make magnetic exploration instruments having a balance magnet system mounted in a damping fluid. The damping fluid has a viscosity that permits the user to take fairly rapid readings without undue oscillation of the indicating needle of the balance magnet system. Attempts have been made to provide an instrument in which the fluid has a specific gravity such that the mass of the moving balance magnet system is substantially equal to the mass of the liquid that it displaces. It has been realized that by doing this the magnet system becomes essentially weightless and that the resistance to shock on the magnetic system by impact to the instrument casing is reduced. The wear on the bearings and accuracy with which the balancing can be done is also improved. The general method has been to take the magnetic system and place it in a liquid having a specific gravity such that it will sink, and to progressively file or grind away parts of the balance magnet system to reduce its weight until it just begins to float. The disadvantage with this system is that it is very difficult to achieve an accurate result and the filing or grinding results in throwing the magnet system off of its mechanical balance, with resulting increase in bearing friction and loss of general accuracy. Thus the accuracy of the devices according to the prior art have left something to be desired and, because of the grinding procedures employed, no two instruments are the same.

According to this invention the balance magnet system is mechanically balanced and then the liquid within which it is to be submerged is mixed to the correct specific gravity without making any mechanical change to the mechanically balanced magnet system. It has been found that miscible liquids of the same general type having different specific gravities can be obtained, and that by taking two such liquids having different specific gravities, one within which the magnet system will sink, and the other within which the magnet system will float, and placing the magnet system in one of the liquids and adding a quantity of the other until the magnet system changes its condition as between submersion and floating, it is possible to accurately arrive at a mixed liquid having the required specific gravity within which the balance magnet system will be essentially weightless. The resulting improvement in the instrument from the point of view of accuracy, resistance to shock, etc. is most remarkable. Further, the procedure is simplified from the old procedure and results in a more economical instrument from the manufacturing point of view.

The invention further contemplates the use of a sensitivity magnet in a magnetometer especially adapted to increase the utility of the instrument when it is used as a dip-needle.

It is common to use a magnetometer as a dip-needle because in many instances one is concerned with a rough indication of the vertical pull of the earth's magnetic field and does not want to take the time to balance the instrument at each location. It is practice to weight the balance magnet system so that it will be stable at the zero point in a magnetometer. This makes the instrument less accurate when it is used as a dip-needle because the effect of the weight which tends to cause the needle to zero becomes greater as the needle moves away from the zero position. Thus the movement of the needle, due to changes in the field being explored as the needle moves away from the zero position, is not constant for a given change in the explored field over the range of the needle travel. This invention contemplates a sensitivity magnet for the purpose of compensating for the effect of this weight over the travel of the needle.

The invention will be clearly understood after reference to the following detailed specification read in conjunction with the drawings.

Figure 2:
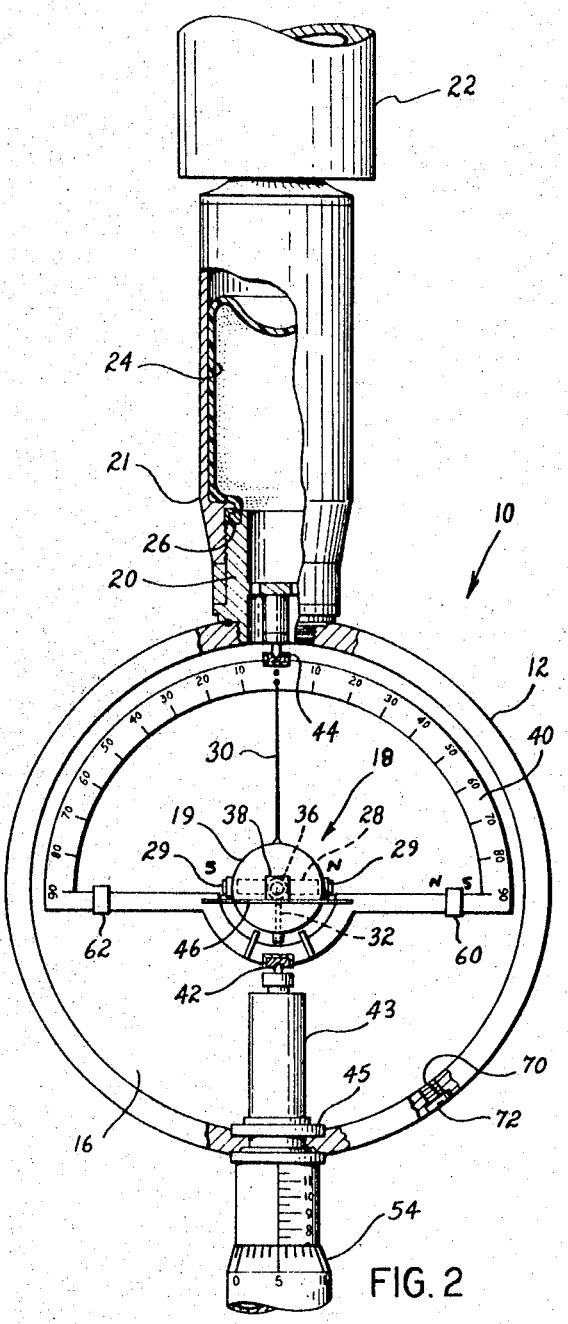

In the drawings:
FIGURE 1 is a perspective view of a magnetometer partly broken away to show construction;
FIGURE 2 is a front view of the same magnetometer also partly broken away to show construction;
FIGURE 3 is a partial view of the same magnetometer illustrating the micrometer adjustment for the compensating magnet;
FIGURE 4 is a view illustrating the vernier arrangement of the micrometer, and
FIGURE 5 is a perspective view showing the balance magnet assembly.

The instrument shown in the drawings is a magnetometer adapted to measure the variation of the vertical component of the earth's magnetic field as it is moved from location to location. It has a housing, generally indicated by the numeral 10, and having a ring-like side wall 12, an opaque back wall 14 and a glass front wall 16. The side and back walls are integral and made of aluminum and all walls combine to form a liquid-tight chamber for a balance search magnet system, generally indicated by the numeral 18, to be referred to in detail later. A neck 20 in rigid fluid-tight relation with the side walls 12 of the housing has an extension 21 screw threaded thereon that in turn universally connects to the handle 22 by means of viscous-damped gimbal-type joint so that when the unit is held by the handle 22 substantially vertically, as illustrated in FIGURE 1, the housing will level itself in the earth's gravitational field. The self-levelling gimbal-type mechanism is of standard design in instruments of this type, and since no claim is made to its novelty, detail of its design is omitted from this specification.

The chamber of housing 10 is filled with a liquid and communicates through a passage in neck 20 with an expansible plastic sack 24. The chamber and sack are filled with liquid to the exclusion of all air and/or other gases, the expansible sack 24 being provided to permit the liquid to expand and contract with variations in temperature. It will be noted that the expansible sack 24 makes a peripheral fluid-tight connection with neck 20 at the upper end of the neck as at 26.

The balance search magnet system, generally indicated by the numeral 18, comprises a hollow aluminum drum shaped piece 19, having a transversely extending tube to house a search or balance magnet 28, an indicator 30, and a tube to threadedly receive a weighted balance screw 32. The axis of the indicator and the axis of the balancing screw are aligned and located midway between and parallel to the two parallel flat ends of the drum 19. The axis of the tube that houses the search or balancing magnet is at right angles to the axes of the indicator and adjusting weight and also midway between and parallel to the two flat ends of the drum 19. Cooperating set screws 29 locate the magnet 28 in its tube. Drum 19 has jewel bearings 36 centrally located on its two flat ends that engage with the points 38 of the harness for the balance magnet system 18.

Balance magnet system 18 is gravitationally balanced for rotation about pivot points 38 before magnet 28 is magnetized. The procedure for balancing the magnetic system is to immerse the system in a liquid of the type that will fill the casing and of about the same specific gravity and then put the liquid under vacuum to ensure that all air is removed from the threads of the screws that enter it and from the inside thereof. The air will bubble out on application of the vacuum and liquid will enter the space. The liquid is essentially the same in specific gravity as the liquid that will be used in the housing. From experience one knows what this will be approximately but, as will be apparent later, the exact specific gravity is not yet determined. The small difference in the specific gravity of the liquid within which balancing takes place and the liquid that ultimately fills the chamber of the casing is not of practical importance. The liquid used for balancing in this particular case is a silicone liquid like one of the two liquids that are mixed to form the liquid for the chamber of housing 10.

The drum is then mounted for rotation about its bearings 36 in a harness between pins similar to the pins 38 and balanced for rotation by adjustment of the position of the magnet 28 and the weight 32 while still immersed in the liquid. The method of balancing is to lower the weight 32 until the weight is lower than the pointer and below a horizontal line through the pivot axis of the drum. The position of the magnet 28 is then adjusted by manipulating the set screws 29 to cause the magnet 28 to assume a horizontal position and the pointer 30 to assume a vertical position. The weighted screw 32 is then turned inwardly to move it in an upward direction until the drum becomes unstable in its pivotal mounting. It is then perfectly balanced but unstable, and in practice the system is sensitized so that the needle can be zeroed on the scale by backing the screw off about ¼ turn to ½ turn to give a desired instrument sensitivity. With this instrument a sensitivity of between 25 to 50 gammas per increment on the micrometer scale is practical in the more sensitive range, i.e. when the compensating magnet is relatively far away from the balancing magnet. Thus the balance magnet system 18 is gravitationally balanced and sensitized in liquid. The balance magnet system is then magnetized by subjecting it to a strong magnetizing force to create the two ends of the magnet thereof permanent North and South magnetic poles. It is now ready for mounting in a harness in the magnetometer, as will be described.

The magnet 28 is made from a permanently magnetizable nickel iron alloy. The drum 19, the set screws 29 and weight screw 32 are all made from aluminum to achieve a common coefficient of expansion. A weight carried by screw 32 is brass.

Within the housing the balance magnet system is mounted in a harness that permits movement of the balance magnet system about an axis of declination and also about an axis of inclination for the purposes of the instrument. The harness comprises a frame 40 mounted between pivots 42 and 44 for free rotational movement about an axis that is vertical when the body 10 of the instrument is suspended from the gimbal suspension of the handle 22. The bearing for pivot 42 is rigidly screw mounted on the sealed inner end of a tube 43 that extends through the side wall 12 of the housing and is clamped in fluid-tight relation therewith by nut 45. Bearing for pivot 44 is screw threaded into a socket on neck 20. A ring 46 carries pins 38 with which bearings 36 cooperate to mount the balance magnet system 18 for rotation about an axis that is at right angles to the axis of rotation of frame 40.

A compensating magnet 50, which is adapted in use to exert a compensating force on the balance magnet 28 to bring it to the zero position on the dial to measure the vertical component of the earth's magnetic pull in use, is housed within the tube 42. It is carried by the drum 52 of a micrometer. Micrometer drum 52 has a sleeve 54 that extends over the outside surface of tube 43 and a threaded portion 56 that threadedly engages with the threaded exterior of the tube 43, whereby rotation of the drum 52 carries the drum assembly up or down the threaded length of the tube 43 to carry the compensating magnet 50 towards or away from the balance magnet 28. The exterior surface of tube 43 is calibrated with micrometer calibrations and the edge of the sleeve 54 is calibrated as the micrometer vernier. The vernier is divided into fifty equal divisions and each turn of the drum assembly is calibrated on the exterior of the tube 43. Thus, each turn of the micrometer drum can be measured in fiftieths by means of the vernier scale.

The lower end of the tube 43 is split and a tensioning ring 56 is threaded thereon and adapted to exert a tensioning pressure on the micrometer drum and thereby take up slack. There is no novelty in the micrometer arrangement per se and further detail is thought to be unnecessary in this application.

As indicated above, the chamber of the housing 10 is filled with a iquid for the purpose of damping the movement of the balance magnet system. The liquid has a specific gravity such that the mass of the balance magnet system is substantially equal to the mass of the liquid that it displaces. Damping liquids in instruments of this type are not broadly new, but the method of achieving the liquid according to this invention permits of a more accurate and more shock resistant instrument because the balance system is essentially weightless. This is achieved by taking the mechanically balanced drum and two beakers of liquid of the type to occupy the chamber of the housing but of slightly different specific gravities. In one of the liquids, say liquid A, the drum will float with its upper surface just breaking the surface of the liquid. In the other of the liquids, say liquid B, the drum sinks slowly to the bottom. The procedure of obtaining the correct specific gravity is to set the gravitationally balanced drum 19 in liquid A and pour and mix liquid B into liquid A until the drum just submerges and very slowly sinks. Extra liquid A is then poured in the drum beaker until the drum very slowly rises. Further minute quantities of liquid B are added to achieve a very slow submersion. The drum will sink if it is submerged, provided that if the mass of the drum assembly is exactly equal to the mass of the liquid it displaces, in which case it will move with the liquid in accordane with currents therein. The latter condition is practically impossible to achieve, but by adding and mixing first one liquid to the liquid body containing the drum and then the other to cause the body to sink and rise respectively and reducing the amount of added liquid to achieve the change of condition, one can come very close to the desired theoretical condition.

With a balance magnet assembly of the type described made of aluminum, the mass is such that it will float as required in a silicone fluid having a specific gravity at 77° F. of about .818. If the balance magnet assembly is placed in a beaker of such a fluid as described above and a miscible fluid of the same type but having a specific gravity of 761 is added thereto, the balance magnet system can be caused to submerge and slowly sink. It will rise again, as explained above, if a further quantity of the fluid having the higher specific gravity of .818 is added. Particular silicone fluids used with success are sold in the United States by Dow Corning Corporation and known in the trade as Dow Corning Fluid 200. The properties of the two miscible fluids used and mixed together as described above to achieve weightlessness of the balance magnet system described herein with success are as follows:

DOW CORNING FLUID 200

| Viscosity[1] at 25° C., centistokes | Flash point[2] (° F.) | Pour point[3] (° F.) | Specific gravity at 77° F. | Visc.-temp. co-efficient[4] | Coefficient of expansion, cc./cc./° C. | Refractive index at 77° F. | Surface tension at 77° F., dyne/cm. | Thermal conductivity[5] at 77° F. | Boiling point,° |
|---|---|---|---|---|---|---|---|---|---|
| 0.65 | 30 | [6] −90 | 0.761 | 0.31 | 0.00134 | 1.375 | 15.9 | 0.00024 | 211° F at 760 mm. |
| 1.0 | 100 | [6] −123 | 0.818 | 0.37 | 0.00134 | 1.382 | 17.4 | 0.00024 | 305° F at 760 mm. |

[1] Standard viscosity grades
[2] Open cup ASTM D92-33.
[3] ASTM D97-39 Sect. 5-7.
[4] 1-Viscosity at 210° F./Viscosity at 100° F.
[5] GM-Cal/Sec./cm.s/° C differential/1 cm. thickness.
[6] Freeze point.

After the specific gravity of the liquid to occupy the chamber of the housing has been determined by mixing as above described, the unit is assembled and the mixed liquid is used to fill the chamber. In this respect it will be noted that the side wall has a port 70. After the frame and balance magnet assembly have been mounted in position as described and the front and back walls secured in position and the expansion sack secured in position, the instrument is positioned with the opening 70 in a high position and the liquid is poured into the chamber while maintaining the sack in a supported and depressed position as shown so that it does not stretch unduly because of weight supported. It will be apparent that as liquid enters, the air in the chamber is expelled through the opening 70. When the chamber is full, the opening is capped by means of the screw 72, great care being exercised that all air is removed from the chamber. The instrument is now ready for use.

The frame 40 is graduated in degrees of rotation of the indicator 30 about its pivot points 38 and indicator 30 travels over the graded scale as drum 19 swings about its mounting. Stops limit the swing of drum 19 within practical useful limits.

A magnifying glass is provided for observing the position of indicator 30 on the scale.

In order to take a reading of the vertical component of the earth's magnetic force, the instrument is suspended by the handle 22 whereby the housing hangs in the gravitational field and the axis of declination through the pivot points 42 and 44 is vertical. The instrument is then turned by manipulation of the handle until the frame 40 touches neither the front nor back wall. In this position the balance magnet aligns with the earth's magnetic field about the axis of declination. The pointer 30 on the drum 19 will, unless the balance magnet is balanced by the compensating magnet, incline to the right or to the left of the zero position on the scale of the frame 40. As the balance manget inclines within its bearings 36 and 38 about the axis of inclination of the earth's magnetic field to align with the earth's magnetic field, the magnifying eye piece is placed over the scale of frame 40 and the micrometer drum 52 is rotated to move the compensating magnet 50 towards or away from the balancing magnet 28 until the balancing magnet is in a horizontal position within its axis of inclination as detected by the needle 30 of the drum which houses the balancing magnet being on the zero position of the scale of frame 40. The reading of the micrometer scale setting is read in this condition for that station.

Each instrument is calibrated and the reading of the micrometer scale is related to a calibration chart for the instrument to get a reading in gammas.

It will be noted that the vertical index scale of the micrometer on the outside of the tube 43 has twenty-three divisions. Every other division is numbered from zero to eleven. The micrometer sleeve 54, which rotates around the micrometer barrel, has fifty graduations numbered in fives. Each micrometer barrel division equals one full turn (50 divisions) of the sleeve. Each barrel number represents two turns or one hundred micrometer divisions. Thus, in taking a reading, one counts 50 for each barrel mark covered and adds the vernier sleeve micrometer divisions for exact repeatable readings.

As indicated above, the instrument is calibrated by bringing the instrument on zero at micrometer scale division increments of 50 by means of subjecting the instrument to known vertical magnetic forces achieved with Helmholtz test coil. The gamma value of the vertical pull is recorded for each increment. Following is a typical calibration chart:

| Micrometer scale div. | Average scale const. per div. | Total gamma value |
|---|---|---|
| 0 | 23 | |
| 50 | 23.5 | 1,150 |
| 100 | 24 | 2,325 |
| 150 | 25 | 3,525 |
| 200 | 26 | 4,775 |
| 250 | 27.5 | 6,075 |
| 300 | 29 | 7,450 |
| 350 | 30.5 | 9,800 |
| 400 | 32.5 | 10,425 |
| 450 | 35 | 12,050 |
| 500 | 37 | 13,800 |
| 550 | 40 | 15,650 |
| 600 | 43 | 17,650 |
| 650 | 46 | 19,800 |
| 700 | 49 | 22,100 |
| 750 | 53 | 24,575 |
| 800 | 57 | 27,225 |
| 850 | 61.5 | 30,075 |
| 900 | 66 | 33,150 |
| 950 | 71 | 36,450 |
| 1,000 | 77 | 40,000 |
| 1,050 | 83 | 43,850 |
| 1,100 | 90 | 48,000 |
| 1,150 | 97 | 52,500 |
| 1,200 | | 57,350 |

It will be noted that the sensitivity of the instrument varies over its range. For example, at the lower end of the micrometer scale, each micrometer division represents a change of about 23 gammas, whereas at the upper end each micrometer division represents a change of 97 gammas.

In the mechanical balancing of the drum unit prior to its insertion into the instrument and prior to the magnetization of the balance magnet 28, it was noted that the balance screw 32 was backed off after perfect balance was achieved to achieve a sensitivity of 20 to 50 gammas per division at the most sensitive range. The sensitive range is the lower end of the micrometer scale and experience indicates that a sensitivity of less than 50 gammas per division can be achieved by backing the screw off between a quarter and one half turn, as noted above.

It should also be noted that the compensating magnet has its north pole towards the upper end of the instrument in the northern hemisphere; it will be reversed in the southern hemisphere.

The instrument can also be used as a dip-needle. In this respect one merely suspends the housing in a vertical position by means of the handle 22 and notes the deflection of the pointer 30 on the scale 40 as the instrument is carried over the ground. It will be apparent that as the needle 30 moves off the zero position the effect of the balancing screw 32 tending to return the needle to the zero position on the dial will increase. Thus, when the needle is inclined to, say, the 10° position on the dial, the balance weight 32 exerts a substantially smaller force than it does when the needle is deflected to the 20° position. This general effect of the balance weight 32 is to render the sensitivity of the indicator needle inconsistent over the scale of the frame 40. It would take a greater variation in the vertical component of the magnetic force to make a 1° difference in inclination at the say, 20° deflection area of the dial than it would at, say, the 10° area of the dial in the absence of a sensitivity compensating device.

The magnetometer provides a sensitivity compensating magnet 60 mounted on the arm of the frame 40, as indicated, and having a polarity that tends to repel the polarity of the balance magnet 28. The polarities of the balance magnet and the sensitivity magnet 60 have been indicated on FIGURE 2. It will be apparent that with such a balance magnet, the magnetic poles of the balance magnet 28 and the sensitivity magnet 60 tend to repel each other and act against the weight of the balance screw 32 as the needle inclines away from the zero position. It will be apparent that the weight tends to act to urge the needle to the neutral or zero position and that the force of the compensating magnet acts in opposition thereto to compensate for the force of the weight. Sensitivity magnet 60 can be experimentally located on the frame to achieve a substantially constant travel of the indicator over the dial of the frame 40 for a given change in magnetic force of the field being explored over the scale of the frame 40.

Numeral 62 refers to a weight adapted to mechanically balance the weight of the sensitivity magnet 60.

In use one does not always want station readings of the earth's magnetic pull but is satisfied with a quick relative indication of the change in the field from point to point. With this instrument one can carry it, suspended by the handle, from place to place and observe the change in the inclination of the needle 30 on the dial 40. This is an indication of the field and because of the sensitivity magnet described above, the amount of travel of the needle over the scale is more directly related to the amount of change in field and the relationship between travel and change is substantially constant over the full scale.

In the instrument shown the balance magnet is round in cross-section and has a diameter of ⅛ inch and a length of ⅝ inch. The compensating magnet has a diameter of .046 inch and a length of .090 inch. The sensitivity magnet 60 is very much smaller. All magnets are made from a permanently magnetizable material, such as a material sold under the trade name Alnico 5.

Embodiments of this invention other than the one illustrated and described will be apparent to those skilled in the art. Insofar as method is concerned, the essence is the achievement of weightlessness of the balance magnet system by achieving the correct specific gravity of the liquid in the chamber by mixing two liquids and observing the change in condition between floating and submersion of the balance magnet assembly. This method can be used in any instrument where there is a pivotally mounted magnet system contained in a damping fluid. It is an extremely accurate way to achieve the correct specific gravity and it can be done without upsetting the mechanical balance of the magnet system in any way. It permits the construction of a more sensitive instrument for a given size and provides an instrument that is capable of withstanding considerably more shock impact. These things are extremely important in magnetic search instruments.

The sensitivity magnet 60 greatly improves the utility of the magnetometer as a dip-needle.

Other embodiments of the invention will be apparent to those skilled in the art, and it is not intended that the foregoing description should be read in any limiting sense.

What I claim as my invention is:

1. A method of making a magnetic search instrument having a chamber, a search magnet system mounted for pivotal movement in said chamber, said search magnet system having a search magnet therein adapted to respond to a magnetic field to be explored, a damping liquid solution in said chamber having an instrument specific gravity such that the mass of the liquid displaced by said search magnet system is substantially equal to the mass of said search magnet system, including the steps of mechanically balancing said search magnet system, floating the balanced search system in a contained first damping liquid having a greater specific gravity than said balanced search system, adding and mixing with said first damping liquid a second miscible damping liquid having a specific gravity less than said balanced search system until said balanced search system changes its condition from floating to complete submersion to thereby render said damping solution, removing the balanced search system from said solution and pivotally mounting same in said chamber, and filling said chamber with said solution for completely submerging the mounted balanced search system.

2. A method of making a magnetic search instrument having a chamber, a search magnet system mounted for pivotal movement in said chamber, said search magnet system having a search magnet therein adapted to respond to a magnetic field to be explored, a damping liquid solution in said chamber having an instrument specific gravity such that the mass of the liquid displaced by said search magnet system, is substantially equal to the mass of said search magnet system, including the steps of mechanically balancing said search magnet system, immersing the balanced search system in a contained first damping liquid having a lower specific gravity than said balanced search system, adding and mixing with said first damping liquid a second miscible damping liquid having a specific gravity greater than said balanced search system until said balanced search system begins to rise to thereby render said damping solution, removing the balanced search system from said solution and pivotally mounting same in said chamber, and filling said chamber with said solution for completely submerging the mounted balanced search system.

References Cited

UNITED STATES PATENTS

| | | | |
|---|---|---|---|
| 2,706,366 | 4/1955 | Best | 29—155.5 |
| 2,742,686 | 4/1956 | Franz | 29—155.5 |
| 2,856,581 | 10/1958 | Alldredge | 324—43 |
| 2,861,242 | 11/1958 | Leavitt | 324—43 |
| 36,422 | 1862 | Ritchie | 33—223 |
| 2,590,184 | 3/1952 | Koulomzine | 324—48 |
| 2,627,542 | 2/1953 | Koulomzine | 324—48 |
| 3,069,783 | 12/1962 | Dinsmore | 33—223 XR |

JOHN F. CAMPBELL, Primary Examiner

R. W. CHURCH, Assistant Examiner

U.S. Cl. X.R.

29—595; 33—222; 324—43, 48